US008306220B2

(12) United States Patent
Junod et al.

(10) Patent No.: US 8,306,220 B2
(45) Date of Patent: Nov. 6, 2012

(54) METHOD TO GENERATE A PRIVATE KEY IN A BONEH-FRANKLIN SCHEME

(75) Inventors: Pascal Junod, Vufflens-la-Ville (CH); Alexandre Karlov, Meyrin (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1005 days.

(21) Appl. No.: 12/016,053

(22) Filed: Jan. 17, 2008

(65) Prior Publication Data
US 2009/0185676 A1 Jul. 23, 2009

(51) Int. Cl.
*H04L 9/00* (2006.01)
(52) U.S. Cl. ............ 380/44; 380/30; 380/282; 713/168; 713/187; 726/26
(58) Field of Classification Search ........................ None
See application file for complete search history.

(56) References Cited

U.S. PATENT DOCUMENTS

| 7,010,125 | B2 | 3/2006 | Lotspiech et al. | |
|---|---|---|---|---|
| 7,039,803 | B2 | 5/2006 | Lotspiech et al. | |
| 2008/0075287 | A1* | 3/2008 | Boneh et al. | 380/277 |

OTHER PUBLICATIONS

Kurosawa et al, "Linear Code Implies Public-Key Traitor Tracing", Springer-Verlag, 2004, pp. 172-187.*

Boneh, D., et al., "An Efficient Public Key Traitor Tracing Scheme (Extended Abstract)," CRYPTO'99, Lecture Notes in Computer Sciences 1666, pp. 338-353, Springer-Verlag, 1999.
Chor, B., et al., "Tracing Traitors," CRYPTO'94, Lecture Notes in Computer Sciences 839, pp. 257-270, Springer-Verlag, 1994.
Fiat, A., et al., "Broadcast Encryption," CRYPTO'93 Lecture Notes in Computer Sciences 773, pp. 480-491, Springer-Verlag, 1994.
Kiayias, A., et al., "Pirate Evolution: How to Make the Most of Your Traitor Keys," CRYPTO'07 Lecture Notes in Computer Sciences 4622, pp. 448-465, Springer-Verlag, 2007.
Kurosawa, K, et al., "Linear Code Implies Public-Key Traitor Tracing," Lecture Notes in Computer Science, vol. 2274, pp. 172-187, Springer Verlag, 2002.
Maki, S., "On Long-Lived Public-Key Traitor Tracing," Helsinki University of Technology, Laboratory for Theoretical Computer Science (2000).

* cited by examiner

*Primary Examiner* — Shewaye Gelagay
(74) *Attorney, Agent, or Firm* — DLA Piper LLP US

(57) ABSTRACT

An alternative scheme to the classical Boneh-Franklin scheme simplifies the generation and the use of the asymmetric keys. The alternative scheme takes advantage of the discovery that simpler calculations resulting in exponents of reduced size can be used as part of Boneh-Franklin type scheme. The alternative scheme thus provides a traceable encryption scheme which allows for fast, secure cryptographic calculations to be made while providing the necessary level of security required for reliable tracing capabilities to be achieved.

21 Claims, No Drawings

METHOD TO GENERATE A PRIVATE KEY IN A BONEH-FRANKLIN SCHEME

FIELD OF THE INVENTION

The aim of the present invention is to propose an alternative scheme to the classical Boneh-Franklin scheme in order to simplify the generation and the use of the asymmetric keys.

PRIOR ART

Consider the following scenario: a center would like to broadcast some data to l receivers, where only authorized users (typically, those who have paid a fee) can have access to the data. A possible solution, widely deployed in commercial Pay-TV systems or in secured media distribution systems, for instance, consists in encrypting the data using a symmetric key and to securely transmit to each authorized receiver this key which will be stored in a tamper-proof piece of hardware, like a smartcard.

Unfortunately, tamper-resistant hardware is very difficult and/or costly to design, since it is vulnerable to a wide variety of attacks. Therefore, a malicious user (hereafter called a traitor) can try to retrieve the decryption key from his receiver and distribute it (sell or give away) to unauthorized users (the pirates). Depending on the nature of the encryption schemes in use, we can even imagine situations where a dishonest user will try to mix several legitimate keys in order to build a new one and embed it in a pirate receiver device.

The problem of identifying which receivers were compromised and/or which secret keys were leaked is called traitor tracing. Usually, two modes of traitor tracing are considered: in the black-box mode, the tracing algorithm sends crafty ciphertexts to the rogue receiver and aims at determining which keys it uses while observing its behavior; in the non-black-box model, we assume that the keys (or their combination) can be extracted from the pirate receiver and are known to the tracing algorithm.

Fiat and Naor [1] introduced the concept of broadcast encryption. In their model, there exists a set of l authorized users and the broadcasting center can dynamically specify a privileged subset of authorized users that can decrypt selected ciphertexts (like high-value content, for instance). Later on, Chor, Fiat, and Naor [2] introduced the concept of traitor-tracing to thwart the problem of decryption keys piracy in broadcast encryption schemes; their scheme is k-collusion resistant (or k-resilient) in the sense that at least one traitor is identified with very high probability if there are at most k of them. Later on, Naor, Naor and Lotspiech [3, 4] presented more efficient broadcast encryption schemes with tracing capabilities; it was however shown by Kiayias and Pehlivanoglu [5] that the iterative nature of the tracing procedure allows a pirate to leverage significantly the compromise of a few keys.

Boneh and Franklin [6] proposed a new public-key traitor-tracing scheme based on error-correcting codes, more precisely on Reed-Solomon codes. The Boneh-Franklin non-black-box traitor tracing scheme is k-collusion resistant and deterministic in the sense that all of the traitors are identified with probability 1 as long as at most k of them collude to derive new pirate keys.

PROBLEM TO BE SOLVED

The aim of the present application is an improved key generation and encryption mechanism for Boneh-Franklin and related schemes.

An immediate benefit of the present application is the possibility to use Reed-Solomon codes that are especially optimized to allow faster decryption and key generation. In practice, for large systems and coalitions of medium size, one obtains a decryption speed improvement by almost an order of magnitude.

The present application also addresses the beyond-threshold security of the Boneh-Franklin scheme: if an adversary is able to recover 2k or more secret keys, where k is the maximal collusion size defined prior to the system deployment, then he is able to compute any other secret key (even if they were not compromised) and thus, the security of the system completely collapses. This is mainly due to the fact that the linear tracing code is public. In the present application we propose a way to protect against this issue.

Boneh-Franklin Scheme

Original Boneh-Franklin

We now describe the original Boneh-Franklin algorithm in details as advertised and published in [6]. This description will be the basis for the description of the invention for the fast and secure traceable keys and encryption/decryption mechanisms.

Group Parameters Generation

We need a group $G_q$ (i.e., a set of elements equipped with a mathematical operation) of prime order q in which the Decision Diffie-Hellman problem is hard. Three main choices are thinkable, but other exist:

Scenario 1. We can work in a subgroup of order q of the group Z/pZ, where p and q are large prime numbers and where q|p−1. Typically, q is a 160-bit prime number and p is a 1024-bit prime number. Group elements are 1024-bit numbers requiring 1024 bits of storage/bandwidth; implementing Boneh-Franklin scheme on a prime-order subgroup of Z/pZ requires to be able to perform modular additions, modular subtractions, modular multiplications and modular inversions both on 160-bit and on 1024-bit numbers.

Scenario 2. We can work over a group of points of an elliptic curve [3] over a finite field with characteristic 2 having in the order of $2^{160}$ elements. Group elements require typically 320 bits, but point compression techniques allow decreasing this number down to 160 bits of storage/bandwidth. Implementing Boneh-Franklin scheme on such a group requires that the receiver be able to perform additions, subtractions, multiplications and inversions on 160-bit field elements.

Scenario 3. We can work over a group of points of an elliptic curve over a finite field with a large prime characteristic and having in the order of $2^{160}$ elements. Group elements require typically 320 bits, but point compression techniques allow decreasing this number down to 160 bits of storage/bandwidth. Implementing Boneh-Franklin scheme on such a group requires performing modular additions, modular subtractions, modular multiplications and modular inversions on 160-bit numbers.

Key Generation

We now describe the traceable key public component $\gamma^{(i)}$ generation process as done in [6]. For ease of understanding, we assume from now on that we work in a multiplicative group as described in scenario 1. Basically, the approach of Boneh and Franklin is based on the use of Reed-Solomon codes.

Given the Following Matrix $$A = \begin{pmatrix} 1 & 1 & 1 & \ldots & 1 \\ 1 & 2 & 3 & \ldots & l \\ 1^2 & 2^2 & 3^2 & \ldots & l^2 \\ \vdots & \vdots & \vdots & & \vdots \\ 1^{l-2k-1} & 2^{l-2k-1} & 3^{l-2k-1} & \ldots & l^{l-2k-1} \end{pmatrix} \pmod{q} \quad (20)$$

and considering a basis $b_1, \ldots, b_{2k}$ of the nullspace of A, a new matrix is built $$B = \begin{pmatrix} | & | & | & & | \\ b_1 & b_2 & b_3 & \ldots & b_{2k} \\ | & | & | & & | \end{pmatrix} \quad (21)$$

Consider $\Gamma^-$ as being the rows of B. Thus, $\Gamma^-$ contains l codewords each of length 2k. By observing that any vector in the span of the rows of A corresponds to a polynomial of degree at most l−2k−1 evaluated at the points 1, . . . , l one can construct the rows of B using Lagrange interpolation.

Let k denote the maximal allowed coalition size (i.e., the maximum number of keys that could potentially be mixed by a pirate while keeping the tracing properties). Let g denote a generator of the group $G_q$ of prime order q in which we implement the Boneh-Franklin scheme. Let l denote the maximum number of receivers in the Boneh-Franklin system. Let $1 \leq i \leq l$ denote the identity of the i-th receiver. The following values are computed:

1. The i-th Boneh-Franklin traceable key public component is computed as being the following 2k-valued vector over Z/qZ:

$$\gamma^{(i)} = (u_i \bmod q, iu_i \bmod q, i^2 u_i \bmod q, \ldots, i^{2k-1} u_i \bmod q) \quad (1)$$

where $$u_1 = \left(\prod_{j=1}^{l-1} -j\right)^{-1} \bmod q \quad (2)$$

and $$u_{i+1} = \frac{i-1}{u_i(i-l)} \bmod q \text{ for } 2 \leq i \leq l-1. \quad (3)$$

2. The public key is computed by generating 2k secret values $r_j$:

$$r \in_R Z/qZ \text{ for } 1 \leq j \leq 2k \quad (4)$$

and computing $$h_j = g^{r_j} \text{ for } 1 \leq j \leq 2k. \quad (5)$$

Then 2k secret values $\alpha_j$ are generated:

$$\alpha_j \in_R Z/qZ \text{ for } 1 \leq j \leq 2k \quad (6)$$

and finally the value y is computed as $$y = \prod_{j=1}^{2k} h_j^{\alpha_j} \quad (7)$$

The public key is then defined as being the (2k+1)-valued vector $$(y, h_1, \ldots, h_{2k}) \quad (8)$$

3. The i-th private key secret component $\theta_i$ put in the i-th receiver, is derived from the i-th traceable key public component $\gamma^{(i)} = (\gamma_1^{(i)}, \ldots, \gamma_{2k}^{(i)})$ as $$\theta_i = \frac{\sum r_j \alpha_j}{\sum r_j \gamma_j^{(i)}} \bmod q \quad (9)$$

Encryption

To encrypt a message $m \in G_q$, we first generate a random value $a \in_R Z/qZ$ and the ciphertext is defined as being the (2k+1)-valued vector $$(m \cdot y^a, h_1^a, \ldots, h_{2k}^a) \quad (10)$$

Decryption

Given a ciphertext $c = (s, p_1, \ldots, p_{2k})$, it is easy to see that one can recover m by computing using i-th private key secret component $\theta_i$ $$m = \frac{s}{\left(\prod_{j=1}^{2k} p_j^{\gamma_j^{(i)}}\right)^{\theta_i}} \quad (11)$$

where $\gamma_j^{(i)}$ are the public components of the traceable private key which are used to derive $\theta_i$.

BRIEF DESCRIPTION OF THE INVENTION

In order to simplify the generation and the use of the asymmetric keys, in particular private keys in a public key encryption scheme with traceable private keys formed by a public component and a secret component, we propose a method to generate an i-th private key in a public key encryption scheme with traceable private keys formed by a public component $\gamma^{(i)}$ and a secret component $\theta_i$, according to a maximal coalition factor k, with all arithmetic operations performed within the multiplicative group Z/qZ where q is a prime number, said public component being defined as:

$$\gamma^{(i)} = (1, b \bmod q, b^2 \bmod q, \ldots, b^{2k-1} \bmod q)$$

and said secret component being defined as:

$$\theta_i = \frac{\sum r_j \alpha_j}{\sum r_j \gamma_j^{(i)}} \bmod q$$

where $r_j$ and $\alpha_j$ are uniformly distributed random values in the group Z/qZ, $1 \leq j \leq 2k$ and where the value b may be either public and easily computable or secret and statistically decorrelated.

Furthermore, we propose two possible variants to encrypt any type of message faster than the original Boneh-Franklin scheme with the same tracing and security properties.

DETAILED DESCRIPTION OF THE INVENTION

Traceable Keys for Fast Decryption

We now present a traceable private key public component generation process which allows deriving public components which offer a significantly improved decryption speed.

Previously, we noted that the components $\gamma^{(i)}$ can be computed using the recursive formula Eq. (3); this operation is typically feasible in the broadcasting center, but not in a receiver. We can furthermore note that, working in a usual security configuration of $2^{80}$ operations, the elements of a public component $\gamma^{(i)}$ have all a length of 160 bits.

This new method works as follows: in the key generation process described previously, the step 1 is replaced by 1' We compute the i-th fast Boneh-Franklin traceable private key public component as being the following 2k-valued vector over Z/qZ:

$$\gamma^{(i)}=(1, i \bmod q, i^2 \bmod q, \ldots, i^{2k-1} \bmod q). \quad (12)$$

The method presented below results in rather small exponent sizes which can drastically speed up the ciphertext decryption in the receiver: re-writing (11) as $$m = \frac{s}{\left(\prod p_j^{i^{j-1}}\right)^{\theta_i}} = \frac{s}{\left(((p_{2k}^i p_{2k-1})^i p_2)^i p_1\right)^{\theta_i}} \quad (13)$$

we can transform, for instance for $l=2^{20}$, 2k+1 modular exponentiations with 160-bit exponents by 2k modular exponentiations with 20-bit exponents and one 160-bit exponentiation. This is more than a 7-times speedup.

According a particular embodiment of the invention, q is higher than $2^{127}$ in order to avoid generic attacks against the discrete logarithm problem.

A further advantage of this method is that a receiver can compute the public component of the decryption key without the need to evaluate the recursive formula of Eq. (3).

Traceable Keys for Added Security

In practical scenarios, there might be a situation where an attacker might have 2k secret components $\theta_i$ at his disposal. This part of the invention describes specifically how to the system can be protected in such a case. We start by describing an attack that might occur in practice and allow the attacker to derive every private key in the system.

Let us suppose than an adversary has managed to get 2k private elements $\theta_i$, for $1 \leq s \leq 2k$. The vectors in $I^- = \{\gamma^{(1)}, \gamma^{(2)}, \ldots, \gamma^{(l)}\}$ are assumed to be public. Then, we can rewrite Eq. (9) over Z/qZ as $$\theta_{(i_a)}^{-1} = \frac{\sum_{j=1}^{2k} r_j \gamma_j^{(i_a)}}{\sum_{j=1}^{2k} r_j \alpha_j} = \sum_{j=1}^{2k} \omega_j \gamma_j^{(i_a)} \quad (22)$$

with $\omega_j = r_j / \Sigma r_j \alpha_j$; note that the $\omega_j$ are unknown coefficients to an adversary. However, with 2k private elements, we have a system of 2k linear equations with 2k variables with a single solution revealing the values of $\omega_j$ to the adversary using a simple Gaussian reduction. From those coefficients, the adversary can compute any other private key $\theta_{i_v}$ in the system $$\theta_{i_v} = \left(\sum_{j=1}^{2k} \omega_j \gamma_j^{(i_v)}\right)^{-1} \quad (23)$$

Not only the adversary will be able to create many untraceable combinations of keys, but he will be also able to distribute newly derived keys so that innocent users (whose keys were a priori never compromised) will be accused of treachery.

We now present a traceable key generation process which allows deriving traceable keys resistant to pirates able to gather 2k keys or more. This new method works as follows:

1" We compute the i-th fast Boneh-Franklin public component of the traceable private key as being the following 2k-valued vector over Z/qZ:

$$\gamma^{(i)}=(1, \zeta \bmod q, \zeta^2 \bmod q, \ldots, \zeta^{2k-1} \bmod q). \quad (14)$$

where $\zeta \in_R Z/qZ$ is drawn independently and uniformly at random for each $\gamma^{(i)}$.

We note that the receivers have to store the entire representation $$d^{(i)}=(\theta_i \gamma_1^{(i)}, \ldots, \theta_{2k} \gamma_{2k}^{(i)}) \quad (15)$$

in tamper-proof memory and hence the abovementioned public component becomes secret.

A possible variant would consist in deriving $\zeta$ from i by processing i and/or additional information with a cryptographically secure pseudo-random function (or permutation) parametered by a secret key.

Hybrid Encryption

To encrypt a message $m \in G_q$, the standard Boneh-Franklin encryption procedure requires to generate a random value a $\in_R Z/qZ$ and the ciphertext is defined as being the (2k+1)-valued vector $$(m \cdot y^a, h_1^a, \ldots, h_{2k}^a) \quad (16)$$

In most practical situations, the message m consists in a symmetric session key k, which is then used to encrypt some content, since m is of limited length (no more than 20 bytes, usually). Furthermore, one possibly needs a hash function mapping a group element to a symmetric key.

We propose to bypass these intermediate steps and to use one of the two following possible variants to encrypt any type of message faster than the standard Boneh-Franklin scheme, but keeping the same tracing and security properties.

1. To encrypt a message $m \in \{0, 1\}^*$ (i.e., a bitstring of arbitrary length), we first generate a random value a $\in_R Z/qZ$ and the ciphertext is defined as being the (2k+1)-valued vector $$(m \oplus PRF(n, y^a), h_1^a, \ldots, h_{2k}^a) \quad (17)$$

where PRF(., .) denotes a cryptographically secure pseudo-random function. For instance, it can be HMAC-SHA1, HMAC-SHA256 or a block cipher evaluated on a counter and where $y^a$ is considered as being the symmetric key and n is a nonce value (e.g., a counter incremented sufficiently many times to generate enough key stream). Here, the XOR operation $\oplus$ could be replaced by any group law.

2. To encrypt a message $m \in \{0, 1\}^*$, we first generate a random value a $\in_R Z/qZ$ and the ciphertext is defined as being the (2k+1)-valued vector $$(E(m, y^a), h_1^a, \ldots, h_{2k}^a) \quad (18)$$

where E(., .) is a block cipher or any symmetric encryption scheme based on a block cipher, and where $y^a$ is considered as being the key. A possible variant would consist in mapping the $y^a$ value to a key using a hash function. Another possible variant is an encryption scheme E(., .) requiring additional information, like an initial vector.

Field of Application

In Pay-TV systems, the use of traceable asymmetric keys is an advantage in terms of fighting against piracy. The Pay-TV receiver (or the security module thereof) is loaded with a private key i.e., the public component $\gamma^{(i)}$ and the secret component $\theta_i$. Each Pay-TV receiver, such as a set top-box, multimedia device or wireless portable device (DVB-H), comprises at least one private key. The secret component is preferably stored in a secure container such as a SIM card, smartcard of any type of tamper-proof memory.

In a practical example, a video/audio data packet PSpacket will be encrypted in the following way, assuming we are working with a multiplicative group and HMAC-SHA256 as the function PRF (see formula (17)):
  generate uniformly distributed random value a
  compute $h_1^a, h_2^a, \ldots h_{2k}^a$ using 2k last elements of the public key (see formula (8)),
  compute $y^a$ using the first element of the public key,
  divide the PSpacket into chunk packets of 256 bits possibly remaining a residual packet of less than 256 bits,
  initialize an index to an arbitrary constant (usually 0),
  for each chunk, computing the HMAC-SHA256 of the index with $y^a$ as key, the index being updated for each chunk, and applying an XOR function (or any group operation) with the respective chunk
  in case that a residual chunk exists, adjusting the HMAC-SHA256 value by extracting the number of bit corresponding to the number of bits of the residual chunk before applying the XOR function.
  transmitting to the receiver, the result values after the XOR function and the $h_1^a, h_2^a, \ldots, h_{2k}^a$ In the receiver side, the received values $h_1^a, h_2^a, \ldots, h_{2k}^a$ are considered as 2k values i.e. $p_1, p_2, \ldots p_{2k}$.

In order to extract the audio/video data PSpacket, the following steps will be executed:
  computing $$y^a = \left( \prod_{j=1}^{2k} p_j^{\gamma_j^{(i)}} \right)^{\theta_i}$$

using the $\gamma^{(i)}$ public component of the private key, and $\theta_i$ is the secret component of the private key,
  executing the same HMAC-SHA256 operation as made on the sender side, by defining an index in the same way as defined during the encryption operation.

In this way, the broadcasting center can send a global, encrypted version of audio/video packet to all receivers; those receivers decrypt the packets using their own private key. A pirate willing to implement an unofficial (unlawful) receiver will necessarily have to embed a unique private key (or a mix of several private keys) in order to decrypt the packets. Having such a rogue receiver in hands, the Pay-TV operator can then recover the pirate private key(s) and possibly revoke it (them) using another mechanism and/or possibly take legal or any other action against the person having purchased the original (broken) receiver(s), provided such a link exists.

Instead of mixing the packets with HMAC result, the packets are encrypted with a standard symmetric encryption scheme using a key K, this key being used at the mixing step with the HMAC result.

According to another embodiment, the encrypted packet is obtained by encrypting the said packet with a symmetric encryption scheme using the $y^a$ value as a key (e.g. TDES in CBC mode). According to an alternative embodiment, a hashing function is first applied to the $y^a$ value before being used as a key. This is preferably the case when the size of the $y^a$ value is different than the size of the symmetric encryption scheme key.

Another possible field of application concerns the protection of software against piracy. We may assume that a software is sold together with a hardware dongle containing a different private key for every package. This dongle is able to decrypt a global ciphertext contained in the software and getting a piece of information which is necessary to the use of the software. If a pirate is willing to clone dongles and sell them, he must embed at least a private key. Getting such a pirate dongle in hands, the software seller can then recover the involved private key(s) and take legal or any other action against the person having purchased the original (broken) dongle(s), provided such a link exists.

REFERENCES

[1] A. Fiat and M. Naor, "*Broadcast encryption*", CRYPTO'93, Lecture Notes in Computer Science 773, pp. 480-491, Springer-Verlag, 1994.
[2] B. Chor, A. Fiat and M. Naor, "*Tracing Traitors*", CRYPTO'94, Lecture Notes in Computer Science 839, pp. 257-270, Springer-Verlag, 1994.
[3] J. Lotspiech, D. Naor and M. Naor, "Method for broadcast encryption and key revocation of stateless receivers", U.S. Pat. No. 7,039,803.
[4] J. Lotspiech, D. Naor and M. Naor, "Method for tracing traitor receivers in a broadcast encryption system", U.S. Pat. No. 7,010,125.
[5] A. Kiayias and S. Pehlivanoglu, "*Pirate evolution: how to make the most of your traitor keys*", CRYPTO'07, Lecture Notes in Computer Sciences 4622, pp. 448-465, Springer-Verlag, 2007.
[5] D. Boneh and M. Franklin, "An efficient public-key traitor tracing scheme", CRYPTO'99, Lecture Notes in Computer Sciences 1666, pp. 338-353, Springer-Verlag, 1999.

The invention claimed is:

1. A computer-based method to generate an i-th private key in a public key encryption scheme with traceable private keys formed by a public component $\gamma^{(i)}$ and a secret component $\theta_i$, according to a maximal coalition factor k, with all arithmetic operations performed within a multiplicative group Z/qZ where q is a prime number, said method comprising:
  generating on a computer said public component according to:

$\gamma^{(i)} = (1, i \bmod q, i^2 \bmod q, \ldots, i^{2k-1} \bmod q)$ and generating on a computer said secret component being defined as:

$$\theta_i = \frac{\sum r_j \alpha_j}{\sum r_j \gamma_j^{(i)}} \bmod q$$

where $r_j$ and $\alpha_j$ are random values in the group Z/qZ.

2. The method of claim 1, in which q is higher than $2^{127}$.

3. The method of claim 1, in which the corresponding public key is defined as:
  $(y, h_1, \ldots, h_{2k})$ where $h_j = g^{r_j}$ for $1 \leq j \leq 2k$ and g is a generator of a multiplicative group G of order q, and $$y = \prod_{j=1}^{2k} h_j^{\alpha_j}.$$

4. The method of claim 1, in which the corresponding public key is defined as:

$$(y, h_1, \ldots, h_{2k})$$

where $h_j = g^{r_j}$ for $1 \leq j \leq 2k$ and g is a generator of a multiplicative group G of order q, and $$y = \sum_{j=1}^{2k} \alpha_j h_j.$$

5. The method of claim 1, in which i is selected from 1 to l, l being the number of generated different private keys corresponding to a given public key.

6. The method of claim 1, in which i is selected from 1 to l, l being the number of generated different private keys corresponding to a given public key this method further:
   generating a pseudorandom value $\zeta_i$ in the range of 1 to q−1, q being at least larger than l, the public component being defined as:

$$\gamma^{(i)} = (1, \zeta_i, \zeta_i^2, \ldots, \zeta_i^{2k-1}),$$

associating to the generated secret key data, the pseudorandom value $\zeta_i$.

7. The method of claim 6, in which the pseudorandom value $\zeta_i$ is calculated from i such as for each i, only a unique $\zeta_i$ is obtained.

8. The method of claim 6, in which the pseudorandom value $\zeta_i$ is calculated from i and an additional bit string, this calculation being made such as for each i, only a unique $\zeta_i$ is obtained.

9. A computer-based method to decrypt a ciphertext c to obtain a message m, the ciphertext being formatted as follows:
   $c = (s, c_1, \ldots, c_{2k})$; $s, c_1, \ldots, c_{2k}$ are members of a multiplicative group G of order q, the method comprising:
   decrypting on a computer the ciphertext c according to:

$$m = \frac{s}{\left( \prod c_j^{\gamma_j^{(i)}} \right)^{\theta_i}}$$

wherein all the arithmetic calculations in the decrypting step are performed in said multiplicative group G of order q; and
   wherein $\gamma^{(i)}$ is a public component and $\theta_i$ is a secret component of an i-th private key in a public key encryption scheme with traceable private keys formed by $\gamma^{(i)}$ and $\theta_i$ according to a maximal coalition factor k, with all arithmetic operations for generating the private key performed within a multiplicative group Z/qZ where q is a prime number; and wherein $$\gamma^{(i)} = (1, i \bmod q, i^2 \bmod q, \ldots, i^{2k-1} \bmod q)$$

and $$\theta_i = \frac{\sum r_j \alpha_j}{\sum r_j \gamma_j^{(i)}} \bmod q$$

where $r_j$ and $\alpha_j$ are random values in the group Z/qZ.

10. A computer-based method to decrypt a ciphertext c to obtain a message m, the ciphertext being formatted as follows:
    $c = (s, c_1, \ldots, c_{2k})$; $s, c_1, \ldots, c_{2k}$ are members of an additive group G of order q, the method comprising:
    decrypting on a computer the ciphertext c according to:

$$m = s - (\Sigma c_j \gamma_j^{(i)}) \theta_i$$

wherein all the arithmetic calculations in the decrypting step are performed in said additive group G of order q; and
    wherein $\gamma^{(i)}$ is a public component and $\theta_i$ is a secret component of an i-th private key in a public key encryption scheme with traceable private keys formed by $\gamma^{(i)}$ and $\theta_i$ according to a maximal coalition factor k, with all arithmetic operations for generating the private key performed within a multiplicative group Z/qZ where q is a prime number; and wherein $$\gamma^{(i)} = (1, i \bmod q, i^2 \bmod q, \ldots, i^{2k-1} \bmod q)$$

and $$\theta_i = \frac{\sum r_j \alpha_j}{\sum r_j \gamma_j^{(i)}} \bmod q$$

where $r_j$ and $\alpha_j$ are random values in the group Z/qZ.

11. A computer-based method to decrypt a ciphertext c to obtain a message m, the ciphertext being formatted as follows:
    $c = (s, c_1, \ldots, c_{2k})$; $c_1, \ldots, c_{2k}$ are members of an additive group G of order q, and s is an arbitrary bitstring, method comprising:
    decrypting on a computer the ciphertext c according to:
    $m = D_K(s)$ and where K is a computed as follows:

$$K = (\Sigma c_j \gamma_j^{(i)}) \theta_i$$

wherein all arithmetic calculations are performed in said additive group G of order q, and D is the decryption operation of a symmetric encryption scheme and K is the key; and
    wherein $\gamma^{(i)}$ is a public component and $\theta_i$ is a secret component of an i-th private key in a public key encryption scheme with traceable private keys formed by $\gamma^{(i)}$ and $\theta_i$ according to a maximal coalition factor k, with all arithmetic operations for generating the private key performed within a multiplicative group Z/qZ where q is a prime number; and wherein $$\gamma^{(i)} = (1, i \bmod q, i^2 \bmod q, \ldots, i^{2k-1} \bmod q)$$

and $$\theta_i = \frac{\sum r_j \alpha_j}{\sum r_j \gamma_j^{(i)}} \bmod q$$

where $r_j$ and $\alpha_j$ are random values in the group Z/qZ.

12. A computer-based method to decrypt a ciphertext c to obtain a payload m, the ciphertext being formatted as $c = (s, c_1, \ldots, c_{2k})$ where $c_1, \ldots, c_{2k}$ are members of a multiplicative group G of order q, and s comprising at least the encrypted payload m, method comprising:
    decrypting on a computer the ciphertext c according to:
    $m = D_K(s)$ and where K is a computed as follows:

$$K = \left(\prod c_j^{\gamma_j^{(i)}}\right)^{\theta_i}$$

wherein all arithmetic calculations in the decrypting step are performed in said multiplicative group G of order q, and D is the decryption operation of a symmetric encryption scheme and K is the key; and wherein $\gamma^{(i)}$ is a public component and $\theta_i$ is a secret component of an i-th private key in a public key encryption scheme with traceable private keys formed by $\gamma^{(i)}$ and $\theta_i$ according to a maximal coalition factor k, with all arithmetic operations for generating the private key performed within a multiplicative group Z/qZ where q is a prime number; and wherein $$\gamma^{(i)} = (1, i \bmod q, i^2 \bmod q, \ldots, i^{2k-1} \bmod q)$$

and $$\theta_i = \frac{\sum r_j \alpha_j}{\sum r_j \gamma_j^{(i)}} \bmod q$$

where $r_j$ and $\alpha_j$ are random values in the group Z/qZ.

13. The method of claim 11, wherein the encrypted payload s further contains additional information required by the symmetric decryption scheme D.

14. The method of claim 12, wherein the encrypted payload s further contains additional information required by the symmetric decryption scheme D.

15. The method of claim 11, wherein said symmetric decryption scheme D uses K'=H(K) where H is a hash function.

16. The method of claim 12, wherein said symmetric decryption scheme D uses K'=H(K) where H is a hash function.

17. The method of claim 13, wherein said symmetric decryption scheme D uses K'=H(K) where H is a hash function.

18. A decryption device for decrypting a ciphertext c to obtain a message m, the cyphertext being formatted according to c=(s, $c_1$, ..., $c_{2k}$), s, $c_1$, ..., $c_{2k}$ being members of a multiplicative group G of order q, the decryption device comprising:

a memory for storing a private key, the private key being an i-th private key in a public key encryption scheme with traceable private keys formed by a public component $\gamma^{(i)}$ and a secret component $\theta_i$, according to a maximal coalition factor k, with all arithmetic operations for generating the private key performed within a multiplicative group Z/qZ where q is a prime number, where $$\gamma^{(i)} = (1, i \bmod q, i^2 \bmod q, \ldots, i^{2k-1} \bmod q)$$

and where $$\theta_i = \frac{\sum r_j \alpha_j}{\sum r_j \gamma_j^{(i)}} \bmod q$$

where $r_j$ and $\alpha_j$ are random values in the group Z/qZ; and a processor connected to the memory;
wherein the decryption device is configured to perform the steps of:
decrypting the message m according to $$m = \frac{s}{\left(\prod c_j^{\gamma_j^{(i)}}\right)^{\theta_i}};$$

wherein all arithmetic calculations in the decrypting step are performed in said multiplicative group G of order q.

19. A decryption device for decrypting a ciphertext c to obtain a message m, the cyphertext being formatted according to c=(s, $c_1$, ..., $c_{2k}$), s, $c_1$, ..., $c_{2k}$ being members of a multiplicative group G of order q, the decryption device comprising:

a memory for storing a private key, the private key being an i-th private key in a public key encryption scheme with traceable private keys formed by a public component $\gamma^{(i)}$ and a secret component $\theta_i$, according to a maximal coalition factor k, with all arithmetic operations for generating the private key performed within a multiplicative group Z/qZ where q is a prime number, where $$\gamma^{(i)} = (1, i \bmod q, i^2 \bmod q, \ldots, i^{2k-1} \bmod q)$$

and where $$\theta_i = \frac{\sum r_j \alpha_j}{\sum r_j \gamma_j^{(i)}} \bmod q$$

where $r_j$ and $\alpha_j$ are random values in the group Z/qZ; and a processor connected to the memory;
wherein the decryption device is configured to perform the steps of:
decrypting the message m according to $$m = s - (\Sigma c_j \gamma_j^{(i)}) \theta_i;$$

wherein all arithmetic calculations in the decrypting step are performed in said multiplicative group G of order q.

20. A decryption device for decrypting a ciphertext c to obtain a message m, the cyphertext being formatted according to c=(s, $c_1$, ..., $c_{2k}$), s, $c_1$, ..., $c_{2k}$ being members of a multiplicative group G of order q, the decryption device comprising:

a memory for storing a private key, the private key being an i-th private key in a public key encryption scheme with traceable private keys formed by a public component $\gamma^{(i)}$ and a secret component $\theta_i$, according to a maximal coalition factor k, with all arithmetic operations for generating the private key performed within a multiplicative group Z/qZ where q is a prime number, where $$\gamma^{(i)} = (1, b \bmod q, i^2 \bmod q, \ldots, i^{2k-1} \bmod q)$$

and where $$\theta_i = \frac{\sum r_j \alpha_j}{\sum r_j \gamma_j^{(i)}} \bmod q$$

where $r_j$ and $\alpha_j$ are random values in the group Z/qZ; and a processor connected to the memory;
wherein the decryption device is configured to perform the steps of:

decrypting the message m according to $$m = D_K(s)$$

wherein K is a computed according to $K = (\Sigma c_j \gamma_j^{(i)}) \theta_i$; and wherein all arithmetic calculations in the decrypting step are performed in said multiplicative group G of order q, D is a decryption operation of a symmetric encryption scheme, and K is the key.

21. A decryption device for decrypting a ciphertext c to obtain a message m, the cyphertext being formatted according to $c = (s, c_1, \ldots, c_{2k})$, $s, c_1, \ldots, c_{2k}$ being members of a multiplicative group G of order q, the decryption device comprising:

a memory for storing a private key, the private key being an i-th private key in a public key encryption scheme with traceable private keys formed by a public component $\gamma^{(i)}$ and a secret component $\theta_i$, according to a maximal coalition factor k, with all arithmetic operations for generating the private key performed within a multiplicative group Z/qZ where q is a prime number, where $$\gamma^{(i)} = (1, i \bmod q, i^2 \bmod q, \ldots, i^{2k-1} \bmod q)$$

and where $$\theta_i = \frac{\sum r_j \alpha_j}{\sum r_j \gamma_j^{(i)}} \bmod q$$

where $r_j$ and $\alpha_j$ are random values in the group Z/qZ; and a processor connected to the memory;

wherein the decryption device is configured to perform the steps of:

decrypting the message m according to $$m = D_K(s) \text{ and}$$

wherein K is a computed according to $$K = \left( \prod c_j^{\gamma_j^{(i)}} \right)^{\theta_i};$$

and wherein all arithmetic calculations in the decrypting step are performed in said multiplicative group G of order q, D is a decryption operation of a symmetric encryption scheme, and K is the key.

* * * * *

UNITED STATES PATENT AND TRADEMARK OFFICE
CERTIFICATE OF CORRECTION

PATENT NO. : 8,306,220 B2
APPLICATION NO. : 12/016053
DATED : November 6, 2012
INVENTOR(S) : Pascal Junod et al.

It is certified that error appears in the above-identified patent and that said Letters Patent is hereby corrected as shown below:

In the Specifications:

Column 3, line 1-9 Formula 20 --
$$A = \begin{pmatrix} 1 & 1 & 1 & \cdots & 1 \\ 1 & 2 & 3 & \cdots & \ell & 15 \\ 1^2 & 2^2 & 3^2 & \cdots & \ell^3 \\ \cdot & \cdot & \cdot & & \cdot \\ \cdot & \cdot & \cdot & & \cdot \\ 1^{\ell-2k-1} & 2^{\ell-2k-1} & 3^{\ell-2k-1} & \cdots & \ell^{\ell-2k-1} \end{pmatrix} \pmod{q}$$
-- should be changed to "
$$A = \begin{pmatrix} 1 & 1 & 1 & \cdots & 1 \\ 1 & 2 & 3 & \cdots & \ell \\ 1^2 & 2^2 & 3^2 & \cdots & \ell^3 \\ \cdot & \cdot & \cdot & & \cdot \\ \cdot & \cdot & \cdot & & \cdot \\ 1^{\ell-2k-1} & 2^{\ell-2k-1} & 3^{\ell-2k-1} & \cdots & \ell^{\ell-2k-1} \end{pmatrix} \pmod{q}$$
"

Column 3, line 20 --Consider Γ as...-- should be changed to "Consider Γ as..."
Column 3, line 20 --Thus, Γ contains 1...-- should be changed to "Thus, Γ contains $\ell$..."
Column 3, line 23 --1-2k-1-- should be changed to "$\ell$-2k-1"
Column 3, line 29 --Let 1 denote...-- should be changed to "Let $\ell$ denote..."
Column 3, line 31 --1≤i≤1-- should be changed to "$1 \leq i \leq \ell$"
Column 5, line 24 --2k + 1-- should be changed to "2k + $\ell$"
Columns, line 42-43 --Γ = {γ$^{(1)}$, γ$^{(2)}$,..., γ$^{(l)}$}-- should be changed to "Γ = {γ$^{(1)}$, γ$^{(2)}$,..., γ$^{(l)}$}"

Column 5, Formula 22 --
$$\theta_{(i_a)}^{-1} = \frac{\sum_{j=1}^{2k} r_j \gamma_j^{i_a}}{\sum_{j=1}^{2k} r_j \alpha_j} = \sum_{j=1}^{2k} \omega_j \gamma_j^{(i_a)}$$
-- should be changed to "
$$\theta_{(i_s)}^{-1} = \frac{\sum_{j=1}^{2k} r_j \gamma_j^{i_s}}{\sum_{j=1}^{2k} r_j \alpha_j} = \sum_{j=1}^{2k} \omega_j \gamma_j^{(i_s)}$$
"

Column 8, line 32 --[5] D. Boneh...-- should be changed to "[6] D. Boneh..."

Signed and Sealed this
Twenty-eighth Day of May, 2013

Teresa Stanek Rea
*Acting Director of the United States Patent and Trademark Office*